United States Patent
Ainslie et al.

(10) Patent No.: US 6,574,406 B2
(45) Date of Patent: Jun. 3, 2003

(54) SELECTIVELY ABSORBING OPTICAL FIBERS FOR OPTICAL AMPLIFIERS

(75) Inventors: Benjamin J. Ainslie, Ipswich (GB); Monica K. Davis, Belmont, MA (US); Matthew J. Dejneka, Corning, NY (US); David A. S. Loeber, Plainville, MA (US); Raymond P. Smith, Woodbridge (GB)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/950,488

(22) Filed: Sep. 11, 2001

(65) Prior Publication Data

US 2003/0053773 A1 Mar. 20, 2003

(51) Int. Cl.[7] ................................................ G02B 6/02
(52) U.S. Cl. ...................................... 385/123; 385/141
(58) Field of Search ................................ 385/123–128, 385/140, 141–145

(56) References Cited

U.S. PATENT DOCUMENTS

| 4,217,027 A | 8/1980 | MacChesney et al. |
| 4,799,946 A | 1/1989 | Ainslie et al. |

(List continued on next page.)

FOREIGN PATENT DOCUMENTS

| EP | 0 243 010 A1 | 10/1987 |
| EP | 0 154 026 | 9/1988 |
| EP | 0 561 918 | 6/1998 |

OTHER PUBLICATIONS

D. A. Chapman, *Erbium Doped Fibre Amplifiers: The Latest Revolution in Optical Communications*, vol. 6, No. 2, Electronics & Communication Engineering Journal, pp. 59–67, (Apr. 1994).

R. Reisfeld and C. K. Jørgensen, *The Nephelauxetic Effect and the Photo–electron Spectra*, Lasers and Excited States of Rare Earths, pp. 124–125, Springer–Verlag, 1977.

D. Marcuse, "Gaussian approximation of the fundamental modes of graded–index fibers", *Optical Society of America Journal*, vol. 68, No. 1, pp. 103–109 (Jan. 1978).

R. Ulrich et al.,"Polarization optics of twisted single–mode fibers", *Applied Optics*, vol. 18, No. 13, pp. 2241–2251 (Jul. 1979).

D. Gloge, "Weakly Guiding Fibers", *Applied Optics*, vol. 10, No. 10, pp. 2252–2258 (Oct. 1971).

H.C. Lefevre, "Single–mode fibre fractional wave devices and polarisation controllers", *Electronics Letters*, vol. 16, No. 20, pp. 778–780 (Sep. 1980).

P.J. Lemaire et al., "High pressure $H_2$ loading as a technique for achieving ultrahigh UV photosensitivity and thermal sensitivity in $GeO_2$ doped optical fibres", *Electronics Letters*, vol. 29, No. 13, pp. 1191–1193, (Jun. 1993).

T. Kitabayashi et al., "Active gain–slope compensation of EDFA using thulium–doped fiber as saturable absorber", *IEICE Trans. Electron.*, vol. E84–C, No. 5, pp. 605–609 (May 2001).

*Primary Examiner*—Akm E. Ullah
*Assistant Examiner*—Michelle R. Connelly-Cushwa
(74) *Attorney, Agent, or Firm*—James V. Suggs (57) ABSTRACT

The invention provides a selectively absorbing optical fiber that is transparent at pump wavelengths, and highly absorbing at signal wavelengths. The selectively absorbing optical fiber includes selectively absorbing species, such as rare earth ions, in concentrations sufficient to provide the desired absorbance selectivity. The fiber is useful as a fiber pigtail for pump lasers in optical amplifiers, where it can reduce the effects of multi-path interference by absorbing stray light with wavelengths in the signal band.

45 Claims, 4 Drawing Sheets

U.S. PATENT DOCUMENTS

| | | | |
|---|---|---|---|
| 5,087,108 A | * | 2/1992 | Grasso et al. ............ 359/341.3 |
| 5,216,728 A | * | 6/1993 | Charlton et al. ................ 372/6 |
| 5,218,665 A | * | 6/1993 | Grasso et al. ............ 359/341.3 |
| 5,363,234 A | * | 11/1994 | Newhouse et al. ......... 359/337 |
| 5,381,505 A | * | 1/1995 | Fischietto et al. .......... 385/123 |
| 5,422,975 A | * | 6/1995 | Kanamori et al. .......... 385/140 |
| 5,530,584 A | * | 6/1996 | Myslinski et al. ....... 359/337.1 |
| 5,594,578 A | * | 1/1997 | Ainslie et al. ............... 359/114 |
| 5,673,342 A | * | 9/1997 | Nelson et al. ................. 385/24 |
| 5,857,053 A | | 1/1999 | Kane |
| 5,995,277 A | * | 11/1999 | Kim et al. .................. 359/134 |
| 6,084,704 A | | 7/2000 | Button et al. |
| 6,181,465 B1 | | 1/2001 | Grubb et al. |
| 6,256,138 B1 | | 7/2001 | Huang |

\* cited by examiner

SELECTIVELY ABSORBING OPTICAL FIBERS FOR OPTICAL AMPLIFIERS

BACKGROUND OF THE INVENTION

1. Field of the Invention

The present invention describes optical fibers, and more particularly a doped optical fiber useful as a pump laser pigtail fiber in an optical amplifier.

2. Description of the Related Art $Er^{3+}$-doped fiber amplifiers have revolutionized optical telecommunications by providing all-optical high-gain, low-noise amplification over many channels without the need for costly electronic repeaters. As the optical path in amplifiers and other optical devices becomes more complex, suppressing reflections off of various components such as, for example, laser diode facets, filters, variable optical attenuators, becomes increasingly difficult. These reflections can be deleterious to amplifier performance. For example, in a process known as multi-path interference (MPI), stray light of wavelengths in the signal band can reflect off of diode facets, be fed back into the amplifier coil and amplified, and interfere with the single pass signal. This contributes noise to the system and degrades the performance of the amplifier. Thus, in current amplifier designs it is preferable that reflections in the signal band from amplifier components, such as pump lasers, be minimized in order to reduce the detrimental effects of multi-path interference (MPI). These specifications are often quite strict, sometimes requiring as much as −17 dB suppression of signal band reflections. Existing methods for meeting this specification are either complex, costly, or produce additional reliability risk.

For example, in one method of MPI suppression pump manufacturers may use anti-reflection coatings in the signal band on the pump laser facet. This design requires a complex coating, since the facet reflectivity must be controlled at both 980 nm for correct pump operation, and around 1550 nm for MPI suppression. Anti-reflection coatings, however, are expensive, and it is often not possible to deposit coatings sufficiently on some surfaces such as pump diode facets, which are required to have high reflectivity or partial transmission at the pump wavelength while also providing facet passivation.

In other configurations, signal band loss in the pump laser fiber pigtail may also be increased by bending the pigtail fiber appropriately around fairly small mandrels. By using appropriately sized mandrels, bend loss for the longer wavelength signal band will be greater than that for the pump wavelength. This design places undesirable restrictions on the amplifier designs, increases reliability risks, and does not work with all fiber profiles.

In an alternative MPI suppression technique, precision positioning of the fiber interface surface with respect to the laser diode facet and the appropriate fiber-surface reflectivity can be used to produce destructive interference of the reflected signal, but this again is costly and requires that only minimal positioning shifts (e.g. less than 300 nm) occur over the lifetime of the pump laser module.

It is thus desirable to have an optical fiber suitable for use as a pigtail for a diode pump laser that can provide MPI suppression in an optical amplifier without coiling, anti-reflection coating, or precision positioning.

SUMMARY OF THE INVENTION

One aspect of the present invention is a selectively absorbing optical fiber for use as a filter which is transparent at wavelengths in a pump band and highly absorbing at wavelengths in a signal band. For use herein, transparent is defined as having an absorption loss of less than about 0.5 dB/m, and highly absorbing is defined as having an absorption loss of greater than about 4.0 dB/m. For example, selectively absorbing optical fibers of the present invention can have an absorption loss of less than about 0.5 dB/m, less than about 0.2 dB/m, or even less than about 0.05 dB/m at wavelengths of in a pump band; and an absorption loss of greater than about 2.0 dB/m, greater than about 4.0 dB/m, or even greater than 5.0 dB/m at wavelengths in a signal band. The pump band may include, for example, wavelengths between 970 and 990 nm, and the signal band may include, for example, wavelengths between 1500 and 1600 nm.

Another aspect of the present invention is a selectively absorbing optical fiber having a core and a cladding layer, wherein at least one of the core layer and the cladding layer includes a selectively absorbing composition; and wherein the selectively absorbing optical fiber has an absorption loss of less than 0.5 dB/m at wavelengths in a pump band, and an absorption loss of greater than 2.0 dB/m at wavelengths in a signal band; and wherein the selectively absorbing optical fiber is used as a filter. The selectively absorbing composition may include a rare earth element. The rare earth element may be, for example, selected from the group consisting of thulium, praseodymium, neodymium, terbium, samarium, and dysprosium. The pump band may include, for example, wavelengths between 970 and 990 nm, and the signal band may include, for example, wavelengths between 1500 and 1600 nm. The selectively absorbing optical fibers of the present invention may be polarization maintaining and/or photosensitive, and may be based on silica, germanosilicate, borosilicate, or aluminosilicate materials.

Another aspect of the present invention is an optical device including a selectively absorbing optical fiber including a core and a cladding layer, wherein at least one of the core layer and the cladding layer includes a selectively absorbing composition; and wherein the selectively absorbing optical fiber has an absorption loss of less than 0.5 dB/m at wavelengths in a pump band, and an absorption loss of greater than 2.0 dB/m at wavelengths in a signal band; and wherein the selectively absorbing optical fiber is used as a filter. The selectively absorbing composition may include a rare earth element. The rare earth element may be, for example, selected from the group consisting of thulium, praseodymium, neodymium, terbium, samarium, and dysprosium. The optical device may include a laser with a pigtail, and the pigtail may include a selectively absorbing optical fiber of the present invention. The optical device may be an optical amplifier, with the selectively absorbing optical fiber of the present invention in the optical path between a pump laser and an amplifying fiber.

Another aspect of the present invention is a method of suppressing multi-path interference due to stray reflected signal in an optical amplifier, the optical amplifier having a pump laser, an amplifying fiber, and an optical path, the method including the steps of including in the optical path a length of selectively absorbing optical fiber, and absorbing the stray reflected signal with the selectively absorbing optical fiber.

The present invention results in a number of advantages over the prior art by providing an optical fiber that is highly absorbent at wavelengths in the signal band (e.g. wavelengths between 1500 and 1600 nm) but not at wavelengths in the pump band (e.g. 970–990). Such a fiber will absorb any stray unwanted reflected signal while permitting the pump energy to pass, thus suppressing multi-path interference. Use of this fiber in a pump laser pigtail adds little to no complexity to the laser manufacturing process and, in an amplifier, decreases the need for costly manufacturing processes such as anti-reflective coating and/or precision positioning control.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed:

The accompanying drawings are included to provide a further understanding of the invention, and are incorporated in and constitute a part of this specification. The drawings illustrate one or more embodiments of the invention, and together with the description serve to explain the principles and operation of the invention.

DETAILED DESCRIPTION OF THE INVENTION

Reference will be made to the present preferred embodiments of the invention, examples of which are described and illustrated in the accompanying drawings.

The selectively absorbing optical fiber of the present invention suppresses multi-path interference in optical amplifiers by absorbing any reflected signal wavelengths while allowing pump wavelengths to pass. The selectively absorbing optical fiber can be pigtailed directly to a pump laser diode, or could be an additional fiber that is spliced into the device. Devices using the inventive selectively absorbing optical fiber do not need expensive Faraday isolators, or require costly anti-reflective films. The new selectively absorbing optical fiber is not sensitive to bending, packaging or deployment, and has good temperature stability because rare earth absorption bands do not shift appreciably with ambient temperature fluctuations. It allows for the manufacture of optical amplifiers with low multi-path interference without adding any components, manufacturing steps or alignment procedures.

Exemplary glass compositions suitable for making the fibers of the present invention are given in Table 1. These selectively absorbing compositions take advantage of the fact that trivalent rare earth ions, for example, thulium, neodymium, terbium, samarium, and dysprosium ions, have high absorbances at the wavelengths typically used as signal wavelengths in optical communication systems, and low absorbances at wavelengths typically used as pump wavelengths in optical amplifiers. For use in erbium doped fiber amplifiers, thulium is a preferred ion, as it has a high absorbance at 1520 nm while having a very low absorbance at 980 nm. While thulium is described exclusively in the examples disclosed hereinbelow, co-doping with any combination of rare earth and transition metal ions, not limited to the examples of Table 1, may be used advantageously in the selectively absorbing optical fibers of the present invention, depending on the application.

TABLE 1

Selectively Absorbing Fiber Compositions.

| Component (wt %) | Possible | More Preferred |
|---|---|---|
| $Tm_2O_3$ | 0–20 | .01–5 |
| $Nd_2O_3$ | 0–20 | 0–.5 |
| $Td_2O_3$ | 0–20 | 0–.5 |
| $Sm_2O_3$ | 0–20 | 0–.5 |
| $Pr_2O_3$ | 0–20 | 0–.5 |
| $Dy_2O_3$ | 0–20 | 0–.5 |
| $Tm_2O_3 + Nd_2O_3 + Tb_2O_3 + Sm_2O_3 + Pr_2O_3 + Dy_2O_3$ | .01–20 | .01–5 |
| OH | 0–.05 | 0–.01 |
| $B_2O_3$ | 0–.15 | 2–7 |
| $SiO_2$ | 80–99 | 95–99 |
| F + Cl + Br | 0–5 | 0–1 |
| $GeO_2$ | 0–20 | 4–20 |
| $Al_2O_3$ | 0–20 | 1–10 |
| Other | 0–20 | 0–20 |

Preferred compositions of the present invention include rare earth doped $GeO_2$—$SiO_2$ and $Al_2O_3$—$SiO_2$ materials. In the 1500–1600 nm region, the $^3H_6$—$^3F_4$ transition is more favored in $GeO_2$—$SiO_2$ hosts than in $Al_2O_3$—$SiO_2$ materials. Since $GeO_2$—$SiO_2$ hosts are generally photosensitive, fibers made of $GeO_2$—$SiO_2$ materials may be desirable if Bragg gratings are to be written in the fiber. In the 970–990 nm region, the $Al_2O_3$—$SiO_2$ materials are somewhat more transparent than the $GeO_2$—$SiO_2$ materials, and may be favored when high transmission of pump energy is desired.

The absorption spectra of the inventive selectively absorbing compositions and optical fibers depend not only on the identity and quantity of rare earth ions therein, but also upon the host matrix in which the rare earth ions are dispersed. For example, additions of fluoride to the glass shift the absorption peak to longer wavelengths, away from the signal band of 1500–1600 nm. Thus, it may be desirable to use concentrations of halogens (F, Cl and Br) of below about 5 weight percent, or, more desirably, below 1 weight percent. The addition of $B_2O_3$ to the selectively absorbing composition shifts the absorbance peak to shorter wavelengths, toward the signal band of 1500–1600 nm. Thus, to increase the absorbance at 1500–1600 nm, it may be desirable to include between about 2 and about 7 weight percent $B_2O_3$ in the selectively absorbing compositions of the present invention.

Optical fibers of the present invention include the rare earth doped selectively absorbing compositions described above as the core, as a cladding layer, or throughout the fiber. The compositional weight percents given throughout the instant specification and claims can therefore apply to the weight of the core, the weight of a cladding layer (either inner and/or outer cladding), the weight of both the core and a cladding layer, or the weight of the entire fiber. As will be understood by the skilled artisan, any undoped regions of the fibers (e.g. core, outer cladding) may be fabricated from undoped compositions similar to the doped selectively absorbing composition.

The dopant profile of a selectively absorbing optical fiber can be arranged preferentially such that the effective absorption of power at signal wavelengths (1500–1650 nm) is enhanced while the effective absorption of power at pump wavelengths (e.g., 965–990 nm) is decreased. One example might be to use a ring dopant profile, where the absorbing material forms an inner cladding layer (e.g., in the region extending outwards from the core-clad interface, rather than in the core itself). In the case of a profile similar to that of Corning® PureMode™ HI 1060 Engineered Fiber, approximately 70–80% of the power at pump wavelengths is carried in the core, while only approximately 30–50% of the power at signal wavelengths is carried in the core, with the remainder of the power carried in the inner cladding region. The mode field calculations necessary to estimate relative power distributions are well known in the art, and are described in D. Gloge, "Weakly guiding fibers," Appl. Opt., 10(10), pp. 2252–2258 (1971) and D. Marcuse, "Gaussian approximation of the fundamental modes of graded-index fibers," J. Opt. Soc. Am., 68(1), pp 103–109 (1978), which are incorporated herein by reference. Thus, by doping the inner cladding region instead of the core region, the absorption in the signal band remains the same or increases (affecting approximately 50–70% of the mode) while the absorption in the pump band is decreased, since only 20–30% of the mode is affected.

The selectively absorbing optical fibers of the present invention may be constructed to be polarization maintaining. As will be described more fully hereinbelow, a polarization maintaining (PM) selectively absorbing optical fiber would be desirable for use with pump lasers and optical amplifiers. Current commercially available polarization maintaining fiber, such as Corning® PureMode™ PM 980 fiber, has a birefringence of $\Delta n_{Bi} \sim 3-5 \cdot 10^{-4}$. Calculations of the maximum bend and twist-induced birefringence which might be caused in a pump pigtail fiber deployed in an amplifier indicate that a PM selectively absorbing optical fiber for 980-nm applications would need a birefringence $\Delta n_{Bi}$ of at least about $1 \cdot 10^{-5}$. Larger birefringence would further extend usage to optical amplifier designs with significant amounts of stress and/or twists.

Germanosilicate fibers of the present invention are photosensitive. A photosensitive selectively absorbing optical fiber allows for the fabrication of Bragg gratings for laser stabilization. As is well understood in the art, enhanced fiber photosensitivity is typically attained through any of increased germania content, inclusion of co-dopants, or hydrogen loading. Hydrogen loading is understood in the art, and is described by P. J. Lemaire et al., "High pressure $H_2$ loading as a technique for achieving ultrahigh UV photosensitivity and thermal sensitivity in $GeO_2$ doped optical fibres" Electron. Lett, 29(13), pp. 1191–1192 (1993). Typically, in fiber Bragg grating formation using either method, doping the fiber core with germania and/or other dopants such as boron or phosphorus is preferable. Typical laser stabilization gratings for pump lasers have a reflection coefficient on the order of 1–10% and bandwidths of 0.5 to 1.0 nm. In the case of a requirement of a 0.5 nm wide grating with 1.0% reflectivity, a UV-induced index change of about $5 \cdot 10^{-5}$ is necessary. In the more demanding case of a requirement of a 1.0 nm wide grating with 10% reflectivity, a UV-induced index change of $3.6 \cdot 10^{-4}$ is necessary. This can be attained in the selectively absorbing optical fibers, using the methods described below. Such photosensitivity would be beneficial, but is not a requirement for a selectively absorbing optical fiber.

For 980 nm band pump applications, a selectively absorbing optical fiber is preferably tailored to properly guide the 980 nm light without a reduction in the coupling efficiency of laser-diode radiation. In addition, the profile and/or mode field diameters must minimize insertion loss at pump wavelengths when splicing the pump in an amplifier. As a result, the preferred refractive index profiles of a polarization maintaining selectively absorbing optical fiber would match that of Corning® PureMode™ PM 980 fiber (mode field diameter=6.6±1 µm at 980 nm). In the case of a non-polarization maintaining fiber, preferred profiles would be similar either to that of Corning® PureMode™ HI 1060 fiber (mode field diameter=5.9±0.5 µm at 980 nm) or Corning® PureMode™ HI 980 fiber (mode field diameter= 4.2±0.5 µm at 980 nm).

A person of ordinary skill in the art is able to fabricate the selectively absorbing fibers of the present invention using known techniques. For example, as described in the Examples below, a modified chemical vapor deposition (MCVD) process may be used to fabricate the fibers of this invention.

Figure 1:
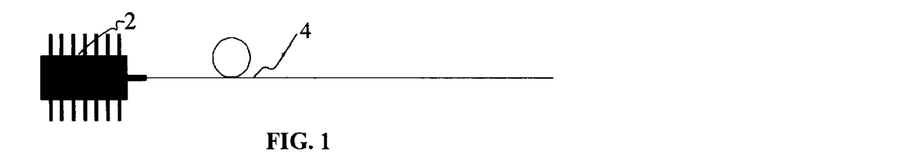
FIG. 1 is a schematic of a selectively absorbing optical fiber used as a pump pigtail fiber.
Figure 2:
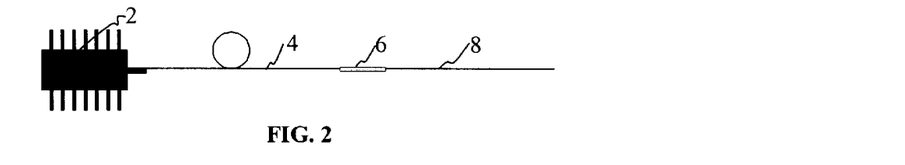
FIG. 2 is a schematic of a selectively absorbing optical fiber used as a pump pigtail fiber with a standard fiber output.
Figure 3:
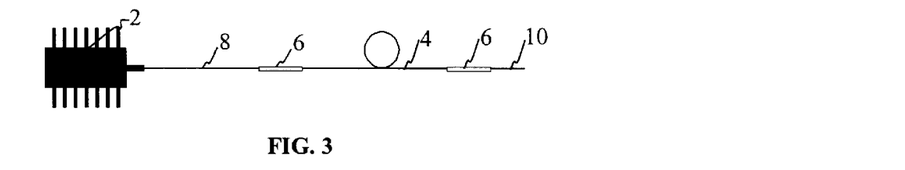
FIG. 3 is a schematic of a selectively absorbing optical fiber contained within the pump pigtail.

A selectively absorbing optical fiber of the present invention can be used to replace the fiber pigtail in current 980 nm pump modules, since the selectively absorbing optical fiber allows significantly more design and manufacturing flexibility. A set of exemplary pump laser configurations incorporating a selectively absorbing optical fiber of the present invention are shown schematically in FIGS. 1–6. In FIG. 1, a selectively absorbing optical fiber 4 is pigtailed directly to a 980 nm diode pump laser 2. In FIG. 2, a selectively absorbing optical fiber 4 is used as a primary pump pigtail fiber. A standard fiber 8 is coupled to selectively absorbing optical fiber 4 by splice 6. Alternatively, a standard optical fiber may be pigtailed to the pump laser, with a selectively absorbing optical fiber coupled thereto by a splice (not shown). In FIG. 3, the selectively absorbing optical fiber 4 is contained within the pump pigtail. Two splices 6, and standard optical fibers 8 and 10 are shown.

Figure 4:
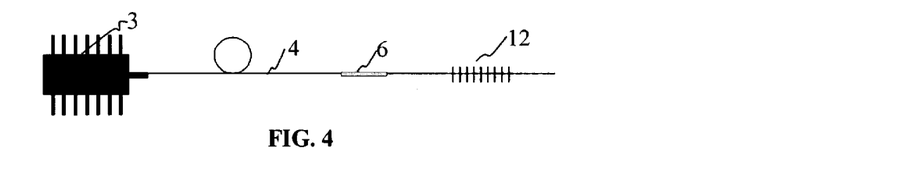
FIG. 4 is a schematic of a selectively absorbing optical fiber used to pigtail a Bragg grating stabilized pump.
Figure 5:
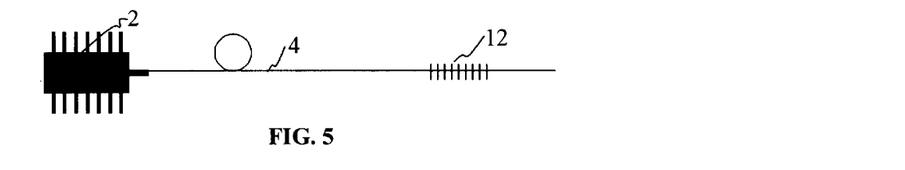
FIG. 5 is a schematic of a selectively absorbing optical fiber used to pigtail a Bragg grating stabilized pump, in which the fiber Bragg grating is written directly into the selectively absorbing optical fiber.
Figure 6:
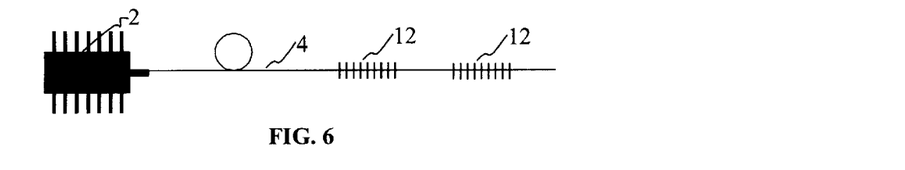
FIG. 6 is a schematic of a selectively absorbing optical fiber used to pigtail a Bragg grating stabilized pump, in which two fiber Bragg gratings are written directly into the selectively absorbing optical fiber.

In FIG. 4 the selectively absorbing optical fiber 4 is pigtailed to the pump laser 2, and is coupled by splice 6 to a fiber having written therein a Bragg grating 12. The Bragg grating is used to stabilize the output wavelength of the pump laser, and may have a reflectivity of about 10%. In FIG. 5, the selectively absorbing optical fiber 4 is photosensitive, and has a Bragg grating written therein. The grating may be written in the photosensitive polarization maintaining optical fiber using methods familiar to the skilled artisan. For example, the grating may be written using a phase mask. In this embodiment, the functions of laser stabilization and MPI suppression are advantageously combined in a single fiber. As the person of skill in the art will appreciate, it may be desirable to include more than one Bragg grating in the selectively absorbing optical fiber pigtail. For example, as shown in FIG. 6, the selectively absorbing optical fiber 4 may include two Bragg gratings.

Typical pigtail fiber lengths are on the order of 1–3 meters long. In some configurations the pump manufacturer controls the length of the selectively absorbing optical fiber 4 (FIG. 2, FIG. 3, FIG. 4, partially FIG. 5, FIG. 6 up to the grating), whereas in others, the customer might adjust the length (FIG. 1, FIG. 5, FIG. 6 beyond the grating). As shown in FIGS. 1–6, typical usage configurations may be without (FIGS. 1–3) or with (FIGS. 4–6) a fiber Bragg grating 12. A preferential selectively absorbing optical fiber 4 would be one in which a fiber Bragg grating 12 could be written, either using inherent fiber photosensitivity, or using hydrogen loading.

Figure 7:
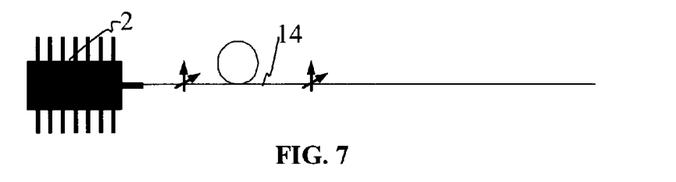
FIG. 7 is a schematic of a polarization maintaining (PM) selectively absorbing optical fiber as a PM fiber pigtail.
Figure 8:
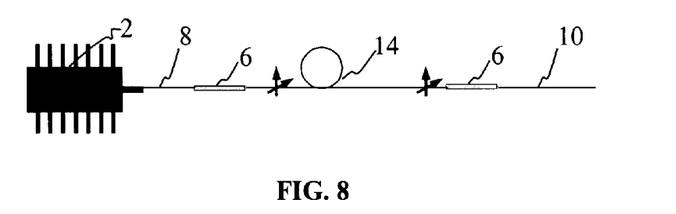
FIG. 8 is a schematic of a selectively absorbing optical fiber as a PM pump pigtail fiber for a grating stabilized pump.
Figure 9:
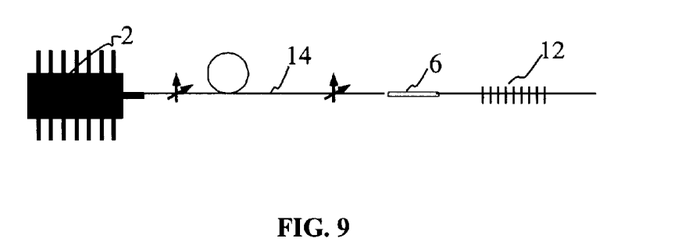
FIG. 9 is a schematic of a PM selectively absorbing optical fiber contained within the pump pigtail.
Figure 10:
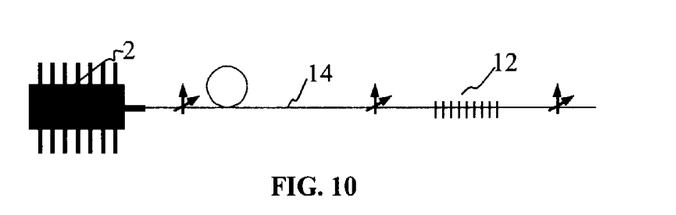
FIG. 10 is a schematic of a PM selectively absorbing optical fiber used to pigtail a PM Bragg grating stabilized pump written directly into a selectively absorbing optical fiber.
Figure 11:
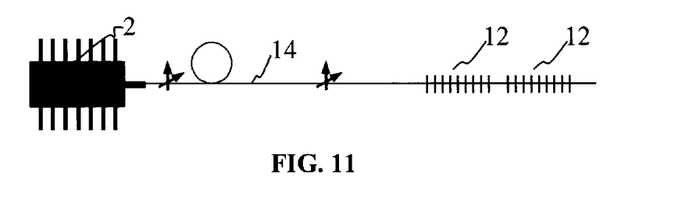
FIG. 11 is a schematic of a PM selectively absorbing optical fiber used to pigtail a PM Bragg grating, in which two Bragg gratings are written directly into a selectively absorbing optical fiber.

A polarization maintaining selectively absorbing optical fiber is desirable for use as a pigtail for pump lasers. One function of the polarization maintaining fiber is to prevent unwanted rotation of the pump light reflected back to the pump laser by a fiber Bragg grating. Polarization rotation can occur due to twists and bend-induced birefringence in a fiber when it is deployed in an amplifier. Exemplary pump laser pigtail configurations using polarization maintaining optical fiber are shown schematically in FIGS. 7–11. In FIG. 7, the PM selectively absorbing fiber 14 is pigtailed directly to the pump laser 2. In FIG. 8, the PM selectively absorbing optical fiber 14 is coupled by splices 6 to standard optical fibers 8 and 10. In FIG. 9, the PM selectively absorbing optical fiber 14 is pigtailed to the pump laser 2, and is coupled by splice 6 to a fiber having written therein a Bragg grating 12. FIGS. 10 and 11 show PM selectively absorbing optical fiber pigtails 14 having, respectively, one and two Bragg gratings 12 written therein. The configurations of FIGS. 8 and 9 have the added advantage that the length of the selectively absorbing optical fiber 14 comes entirely under the control of the pump manufacturer.

Again the pigtail fiber length may be controlled by the pump manufacturer (FIGS. 8 and 9, partially FIGS. 10 and 11—up to the grating) or may be accessed by the end user (FIG. 7, partially FIGS. 10 and 11—beyond the grating). A typical length of PM fiber for the configuration shown in FIGS. 7–11 would be 1.65 to 1.85 m. In preferred embodiments of the invention, the selectively absorbing optical fiber 14 would incorporate both polarization maintaining (PM) properties and photosensitivity, to enable configurations shown in FIGS. 10 and 11.

The shortest length of selectively absorbing optical fiber to achieve a target reflection suppression is determined by the magnitude of the signal band loss coefficient of the fiber, as well as the reflectivity of the fiber endface and the laser diode facet, and the laser diode-to-fiber coupling efficiency. The skilled artisan will appreciate that a stray signal will traverse the fiber twice, once from the amplifying fiber to the laser diode, and once away from the laser diode back to the amplifying fiber. For example assuming 100% reflection and coupling efficiency, given a target of −17 dB of reflectance, and a signal band loss coefficient of −5 dB/m, a minimum fiber length of 1.7 meters would be required.

The longest usable length of selectively absorbing optical fiber is determined by the maximum allowable loss in the pump band and the pump band loss coefficient of the fiber. Loss in the pump band results in less output power at the end of the pigtail, and thus reduces the efficiency and the retail value of the pigtailed pump laser. To maximize pump power and cost benefits, pump loss should be minimized. An acceptable target maximum allowable loss is −0.044 dB (1%) over the length of the absorbing fiber. For a selectively absorbing optical fiber with pump band loss coefficient of −0.01 dB/m, the longest usable length is 4.4 m.

As the person of skill in the art will recognize, selectively absorbing optical fiber may be used as a filter in other amplifier components. For example, it might be advantageously used as one of the fibers in a pump/signal (980/1550) wavelength division multiplexer (WDM) used to combine pump and signal wavelengths in the amplifier. Another exemplary use is in the elimination of cross-talk in the use of a single, high-power pump used to pump multiple amplifiers.

Figure 13:
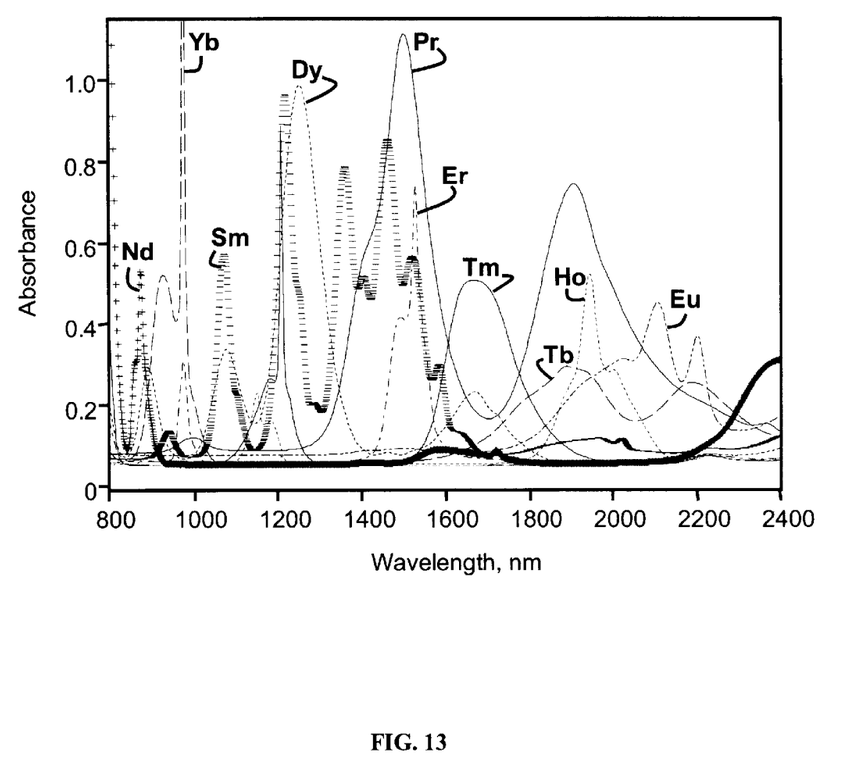
FIG. 13 is an absorption spectrum of various trivalent rare earth ions.

While the exemplary devices and selectively absorbing optical fibers described herein use thulium as an absorbing species and are highly absorbing in the 1500–1600 nm signal band, the skilled artisan will recognize in light of the present disclosure that other rare earth ions may be used advantageously to construct selectively absorbing optical fibers operative in other pump and/or signal bands. FIG. 13 shows absorption spectra of various trivalent rare earth ions. Combinations of these ions may be included in optical fibers by the person of skill in the art using the methods described herein to yield selectively absorbing optical fibers for other pump and/or signal bands. While the ions listed in Table 1 are suggested for use in exemplary selectively absorbing compositions, the present invention is not limited to compositions containing those ions. The skilled artisan will appreciate that any rare earth ion with an appropriate absorption spectrum may be used in the present invention, depending on the application. The absorption loss of the selectively absorbing optical fibers of the present invention may be tuned by the skilled artisan by judicious combination of rare earth ions. For example, a praseodymium doped selectively absorbing optical fiber transparent at wavelengths in a pump band of 780–800 nm and highly absorbing at wavelengths in a signal band of 1400–1530 may be useful in a thulium doped fiber amplifier.

The skilled artisan will likewise appreciate that other absorbing species may be used in the optical fibers and devices of the present invention. For example, in some applications, the use of a transition metal ion with appropriate absorptivities may be advantageous. Likewise, nanoparticles of various binary materials, such as III–V and II–VI semiconductors, may be useful in the selectively absorbing compositions utilized in the present invention. In all cases, it is within the capabilities of the skilled artisan, in light of the present disclosure, to select absorbing species for inclusion in a selectively absorbing compositions based on the desired absorption characteristics of the optical fiber.

The invention will be further clarified by the following examples which are intended to be exemplary of the invention.

EXAMPLE 1

A selectively absorbing optical fiber was fabricated with a thulium doped selectively absorbing material as the core. The MCVD method, well known in the art and disclosed in U.S. Pat. No. 4,217,027, which is incorporated herein by reference, was used. The deposition tube was a 20 mm outer diameter/16 mm inner diameter silica tube. A vapor source of thulium was be generated using a frit generator. A porous silica frit was soaked in an alcoholic solution of $TmCl_3$ and dried in an oven. The frit can be fabricated by methods known in the art, such as those disclosed in U.S. Pat. No. 4,799,946, which is incorporated herein by reference. The soaked frit was placed at the start of the deposition tube and heated to about 1000° C. to generated the desired vapor. The core material was deposited in two passes, each from a vapor stream composed of the thulium vapors from the frit generator, 150 mL/min $O_2$ bubbled through $SiCl_4$ at 24° C., 75 mL/min $O_2$ bubbled through $GeCl_4$ at 24° C., and 3000 mL/min $O_2$ carrier gas. The deposition temperature was 1530° C. No cladding was deposited. The tube was collapsed in a conventional fashion, etching the inner most region of the core before the final collapse pass. The preform was sleeved with a 25 mm outer diameter/19 mm inner diameter tube (to obtain the appropriate aspect of ratio of core diameter to outer diameter), collapsed on a lathe and drawn into fiber. The core of this fiber is essentially thulium doped $GeO_2$—$SiO_2$, and the cladding is essentially $SiO_2$. The core of the fiber had a diameter of 5.4 µm, and the fiber had a mode field diameter of 6.4 µm. The fiber had a $LP_{11}$ mode cut-off at 810 nm, and had a 980 nm loss coefficient of 0.029 dB/m and a 1520 nm loss coefficient of 6.1 dB/m.

Loss at 1540 nm was measured for the fiber in transmission and in a signal reflection configuration. The fiber provided −20 to −25 dB of added return loss in a reflection measurement with approximately 2 m of fiber. By calculations well known to one of ordinary skill in the art, the fiber showed −13 dB/m dual pass return loss at 1540 nm, indicating that only 1.3 m of this fiber would be necessary to meet −17 dB reflection suppression specifications, independent of any other modifications such as chip or fiber coatings. The single pass loss return was −7.9 dB/m at 1540 nm. Measured dual pass loss values are slightly lower than twice the associated measured single pass loss values; this is currently attributed to broadband fluorescence at longer wavelengths which would be preferentially detected in reflection rather than in transmission. This does not affect the utility of the fiber as a selectively absorbing optical fiber, since the net reflection isolation in the 1550 signal band is still significantly below the specification. The transmission at 980 nm was excellent, at about −0.02 dB/m pump loss at 980 nm.

EXAMPLE 2

A selectively absorbing optical fiber was fabricated with a thulium doped selectively absorbing material as the inner cladding. The deposition tube was a 20 mm outer diameter/16 mm inner diameter silica tube. The inner cladding material was deposited in three passes, each from a vapor stream composed of the thulium vapors from the frit generator, 200 mL/min $O_2$ bubbled through $SiCl_4$ at 24° C., 1 mL/min $CCl_2F_2$, and 3000 mL/min $O_2$ carrier gas. The deposition temperature was 1580° C. The core material was deposited in two passes, each from a vapor stream composed of 150 mL/min $O_2$ bubbled through $SiCl_4$ at 24° C., 75 mL/min $O_2$ bubbled through $GeCl_4$ at 24° C., and 3000 mL/min $O_2$ carrier gas. The deposition temperature was 1530° C. The tube was collapsed in a conventional fashion, etching the inner most region of the core before the final collapse pass. The preform was sleeved with a 25 mm outer diameter/19 mm inner diameter tube (to obtain the appropriate aspect of ratio of core diameter to outer diameter), collapsed on a lathe and drawn into fiber. The core of this fiber is essentially $GeO_2$—$SiO_2$, the inner cladding is essentially thulium-doped $SiO_2$, and the outer cladding is essentially $SiO_2$. The core of the fiber had a diameter of 6.2 µm, and the fiber had a mode field diameter of 7.2 µm. The fiber had a $LP_{11}$ mode cut-off at 850 nm, and had a 980 nm loss coefficient of less than 0.01 dB/m and a 1520 nm loss coefficient of 6.0 dB/m.

Loss at 1540 nm was measured for the fiber in transmission and in a signal reflection configuration. Again, the fiber provided −20 to −25 dB of added return loss in a reflection measurement with approximately 2 m of fiber. The fiber showed −13.1 dB/m dual pass loss at 1540 mm, indicating only 1.55 m of this fiber would be required to meet a target reflection suppression of −17 dB. The single pass loss at 1540 nm was −6.8 dB/m. Measured dual pass loss values are slightly lower than twice the associated measured single pass loss values; as described above in connection with Example 1, this is currently attributed to broadband fluorescence at longer wavelengths which would be preferentially detected in reflection rather than in transmission. Again, this does not affect the utility of the fiber as a selectively absorbing optical fiber, since the net reflection isolation in the 1550 signal band is still significantly below the specification. Again, the transmission at 980 nm was excellent, with the ring doped fiber having loss below the measurement capability of the experiment.

Figure 12:
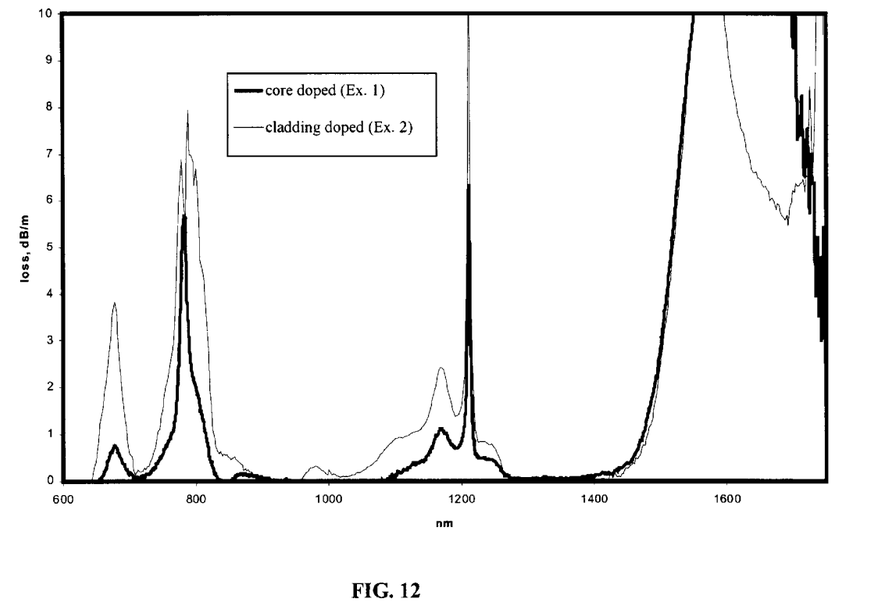
FIG. 12 is an absorption spectrum of core-doped and cladding-doped $GeO_2$—$SiO_2$ selectively absorbing optical fibers of the present invention.

For both Examples 1 and 2, without any splicer optimization, splice loss at 980 nm to Corning® Flexcor™ 1060 fiber was only −0.1 to −0.2 dB. These losses can likely be easily reduced with minor changes to fiber profile and optimization of splice recipes, as would be apparent to the skilled artisan. Spectra comparing the fibers of Examples 1 and 2 are shown in FIG. 12.

EXAMPLE 3

A polarization maintaining selectively absorbing optical fiber was fabricated with a thulium doped selectively absorbing material as the inner cladding. The deposition tube was a 20 mm outer diameter/16 mm inner diameter silica tube. A $B_2O_3$/$GeO_2$-doped $SiO_2$ layer was deposited in five passes. The inner cladding material was deposited in three passes, each from a vapor stream composed of 450 mL/min $O_2$ bubbled through $SiCl_4$ at 24° C., 300 mL/min $O_2$ bubbled through $GeCl_4$ at 24° C., and 34 mL/min $BCl_3$. The deposition temperature was about 1450° C. The tube was then etched by stopping the rotation of the tube and passing a small point burner along one side of the inside of the tube at about 1700° C. and 70 mm/min while flowing a vapor stream composed of 300 mL/min $SF_6$ and 3000 mL/min $O_2$. This etch removed a strip of the $B_2O_3$/$GeO_2$ doped material deposited earlier. The tube was then rotated 180°, and the process was repeated along the side opposing the first etch. The entire tube was then given a very light etch with a vapor stream composed of 15 mL/min $CCl_2F_2$ and 3000 mL/min $O_2$ at a traverse rate of 100 mm/min. The inner cladding material was deposited in one pass from a vapor stream composed of 75 mL/min $O_2$ bubbled through $SiCl_4$ at 24 C, 3000 mL/min $O_2$ carrier gas, and 2000 mL/min He carrier gas; followed by two passes, each from a vapor stream composed of the thulium vapors from the frit generator, 150 mL/min $O_2$ bubbled through $SiCl_4$ at 24° C., 0.5 mL/min $CCl_2F_2$, 3000 mL/min $O_2$ carrier gas, and 2000 mL/min He carrier gas. The deposition temperature was about 1580° C. The core material was deposited in two passes from a vapor stream composed of 100 mL/min $O_2$ bubbled through $SiCl_4$ at 24° C., 52 mL/min $O_2$ bubbled through $GeCl_4$ at 24° C., and 3000 mL/min $O_2$ carrier gas. The deposition temperature was about 1530° C. The tube was collapsed in a conventional fashion, etching the inner region of the core before the final collapse pass. The preform was sleeved with a 18 mm outer diameter/13.4 mm inner diameter tube (to obtain the appropriate aspect of ratio of core diameter to outer diameter) and collapsed on a lathe, yielding a preform with a core and a silica ring as in Example 2, but surrounded by an elliptical deposit, which, upon fiber drawing, provided for the formation of an elliptical core and inner cladding. The core of this fiber is essentially $GeO_2$—$SiO_2$, and is elliptical in cross-section, with a major axis length of 7.8 $\mu$m and a minor axis length of 5.7 $\mu$m. The inner cladding of this fiber is essentially thulium-doped $SiO_2$, and is elliptical in cross-section, with a major axis length of 11.7 mm and a minor axis length of 8.5 $\mu$m. The mode field diameter of this fiber is calculated to be 7.2 $\mu$m. The fiber had a $LP_{11}$ mode cut-off at 943 nm, and had a 980 nm loss coefficient of 0.006 dB/m, a 1530 nm loss coefficient of 4 dB/m, and a 1550 nm loss coefficient of 6 dB/m. The birefringence ($\Delta n_{Bi}$) of this fiber was measured to be about $3 \cdot 10^{-5}$.

TABLE 2 shows data for the fibers of Examples 1, 2 and 3 above, as well as for five other optical fibers (A–E) of the present invention.

| Fiber | Doped region | Core Composition | Single pass loss at 1540 nm (dB/m) | Dual pass return loss at 1540 nm (dB/m) | $L_{min}$ for −17 dB return loss with fiber along (m) | Pump loss at 980 nm (dB/m) |
|---|---|---|---|---|---|---|
| Ex. 1 | Core | $GeO_2$—$SiO_2$ | 7.9 | 13.1 | 1.3 | 0.02 |
| Ex. 2 | Ring | $GeO_2$—$SiO_2$ | 6.8 | 11 | 1.55 | negligible |
| Ex. 3 | Elliptic Ring | $GeO_2$—$SiO_2$ | 5 | 10 | 1.7 | 0.006 |
| A | Core | $GeO_2$—$Ga_2O_3$—$BaO$—$K_2O$ | 4.2 | 8.4 | 2.02 | 1.213 |
| B | Core | $La_2O_3$—$Al_2O_3$—$SiO_2$ | 50 | 100 | 0.17 | 1.97 |
| C | Core | $SiO_2$—$Sb_2O_3$—$Al_2O_3$ | 2.75 | 5.5 | 3.1 | .117 |
| D | Core | $Ta_2O_5$—$SiO_2$ | .836 | 1.672 | 10.2 | .0768 |
| E | Core | $GeO_2$—$Al_2O_3$—$SiO_2$ | 1.33 | 2.66 | 6.54 | .024 |

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A selectively absorbing optical fiber comprising:
   a core; and
   a cladding layer,
   wherein at least one of the core layer and the cladding layer includes a selectively absorbing composition;
   wherein the selectively absorbing optical fiber has an absorption loss of less than 0.05 dB/m at wavelengths in a pump band, and an absorption loss of greater than 2.0 dB/m at wavelengths in a signal band; and
   wherein the optical fiber is used as a filter.

2. The selectively absorbing optical fiber of claim 1 wherein the selectively absorbing composition includes at least one rare earth element.

3. The selectively absorbing optical fiber of claim 2 wherein the rare earth element is selected from the group consisting of thulium, praseodymium, neodymium, terbium, samarium, and dysprosium.

4. The selectively absorbing optical fiber of claim 2 wherein the concentration of an oxide of the rare earth element in the selectively absorbing composition is between about 0.01 weight percent and about 5.0 weight percent.

5. The selectively absorbing optical fiber of claim 1 wherein the pump band includes wavelengths between about 970 and about 990 nm, and the signal band includes wavelengths between about 1500 and 1600 nm.

6. The selectively absorbing optical fiber of claim 5, wherein the rare earth element is thulium as $Tm_2O_3$ and the concentration of $Tm_2O_3$ in the selectively absorbing composition is between about 0.01 weight percent and about 5.0 weight percent.

7. The selectively absorbing optical fiber of claim 5 wherein the core includes the selectively absorbing composition;
   wherein the selectively absorbing composition consists essentially of $SiO_2$, $GeO_2$, and $Tm_2O_3$; and
   wherein the cladding layer consists essentially of $SiO_2$.

8. The selectively absorbing optical fiber of claim 5 wherein the core consists essentially of $GeO_2$ and $SiO_2$;
   wherein the cladding layer is an inner cladding layer essentially in contact with the core layer, and includes the selectively absorbing composition; and
   wherein the selectively absorbing composition consists essentially of $SiO_2$ and $Tm_2O_3$.

9. The selectively absorbing optical fiber of claim 1 wherein the cladding layer is an inner cladding layer essentially in contact with the core layer, and includes the selectively absorbing composition; and the core does not include a selectively absorbing composition.

10. The selectively absorbing optical fiber of claim 1 wherein the selectively absorbing optical fiber has an absorption loss of greater than 4.0 dB/m at wavelengths in a signal band.

11. The optical fiber of claim 10 wherein the pump band includes wavelengths between about 970 and about 990 nm, and the signal band includes wavelengths between about 1500 and 1600 nm.

12. The selectively absorbing optical fiber of claim 1 wherein the selectively absorbing optical fiber has an absorption loss of greater than 5.0 dB/m at wavelengths in a signal band.

13. The selectively absorbing optical fiber of claim 12 wherein the pump band includes wavelengths between about 970 and about 990 nm, and the signal band includes wavelengths between about 1500 and 1600 nm.

14. The selectively absorbing optical fiber of claim 1, wherein the optical fiber is photosensitive.

15. The optical fiber of claim 14 wherein the selectively absorbing optical fiber has a UV-induced index change of at least about $5 \cdot 10^{-5}$.

16. The selectively absorbing optical fiber of claim 1, wherein the selectively absorbing optical fiber is a polarization maintaining fiber, and has a birefringence ($\Delta n_{Bi}$) of at least about $1 \cdot 10^{-5}$.

17. The selectively absorbing optical fiber of claim 1, wherein the selectively absorbing composition includes between 2 weight percent and 7 weight percent $B_2O_3$, and less than 1 weight percent halogens selected from the group consisting of F, Cl and Br.

18. The selectively absorbing optical fiber of claim 1 wherein the concentration of an oxide of the rare earth element in the selectively absorbing composition is between about 0.01 weight percent and about 20 weight percent, and the selectively absorbing composition further comprises less than about 0.05 weight percent OH;
    up to about 15 weight percent $B_2O_3$;
    between about 80 and about 99.99 weight percent $SiO_2$;
    less than about 5 weight percent halogens selected from the group consisting of F, Cl and Br;
    up to about 20 weight percent $GeO_2$;
    and up to about 20 weight percent $Al_2O_3$.

19. The selectively absorbing optical fiber of claim 18 wherein the concentration of the oxide of the rare earth element in the selectively absorbing composition is between about 0.01 weight percent and about 5.0 weight percent.

20. The selectively absorbing optical fiber of claim 18 wherein the concentration of $GeO_2$ in the selectively absorbing composition is at least about 4 weight percent.

21. The selectively absorbing optical fiber of claim 18 wherein the concentration of $Al_2O_3$ in the selectively absorbing composition is between about 1 and about 10 weight percent.

22. The selectively absorbing optical fiber of claim 1 wherein the optical fiber is a polarization maintaining fiber and the core and the cladding layer have elliptical cross-sections.

23. An optical device comprising:
    a selectively absorbing optical fiber including a core, and a cladding layer,
        wherein at least one of the core layer and the cladding layer includes a selectively absorbing composition;
        wherein the selectively absorbing optical fiber has an absorption loss of less than 0.05 dB/m at wavelengths in a pump band, and an absorption loss of greater than 2.0 dB/m at wavelengths in a signal band; and
        wherein the selectively absorbing optical fiber is used as a filter.

24. The optical device of claim 23 wherein the selectively absorbing composition includes at least one rare earth element.

25. The optical device of claim 23 wherein the pump band includes wavelengths between about 970 and about 990 nm, and the signal band includes wavelengths between about 1500 and 1600 nm.

26. The optical device of claim 23 further comprising
    a laser operative in the pump band, the laser having a pigtail,
        wherein the pigtail includes the selectively absorbing optical fiber.

27. The optical device of claim 26 wherein the selectively absorbing optical fiber is photosensitive, and includes a fiber Bragg grating.

28. The optical device of claim 26 wherein the selectively absorbing optical fiber is a polarization maintaining selectively absorbing optical fiber.

29. The optical device of claim 23 wherein the optical device is an optical amplifier, and the selectively absorbing optical fiber suppresses multi-path interference in the optical amplifier.

30. The optical device of claim 23 wherein the optical device is an optical amplifier including a pump laser and an amplifying fiber, and the selectively absorbing optical fiber is in the optical path between the pump laser and the amplifying fiber.

31. The optical device of claim 23 wherein the concentration of an oxide of the rare earth element in the selectively absorbing composition is between about 0.01 weight percent and about 5.0 weight percent.

32. The optical device of claim 23 wherein the selectively absorbing optical fiber has an absorption loss of greater than 4.0 dB/m at wavelengths in a signal band.

33. The optical device of claim 32 wherein the pump band includes wavelengths between about 970 and about 990 nm, and the signal band includes wavelengths between about 1500 and 1600 nm.

34. The optical device of claim 23 wherein the selectively absorbing optical fiber has an absorption loss of greater than 5.0 dB/m at wavelengths in a signal band.

35. The optical device of claim 34 wherein the pump band includes wavelengths between about 970 and about 990 nm, and the signal band includes wavelengths between about 1500 and 1600 nm.

36. The optical device of claim 23 wherein the cladding layer of the selectively
    absorbing optical fiber is an inner cladding layer essentially in contact with the core layer, and includes the selectively absorbing composition; and
        wherein the core of the selectively absorbing optical fiber does not include a selectively absorbing composition.

37. A method of suppressing multi-path interference due to a stray reflected signal in an optical amplifier, the optical amplifier having a pump laser operative in a pump band, an amplifying fiber operative in an signal band, and an optical path, comprising the steps of:
    (a) including in the optical path a length of selectively absorbing optical fiber, the selectively absorbing optical fiber including a core and a cladding layer, wherein at least one of the core layer and the cladding layer includes a selectively absorbing composition, wherein the selectively absorbing optical fiber has an absorption loss of less than 0.05 dB/m at wavelengths in a pump band, and an absorption loss of greater than 2.0 dB/m at wavelengths in a signal band, and wherein the selectively absorbing optical fiber is used as a filter; and
    (b) absorbing the stray reflected signal with the selectively absorbing optical fiber.

38. The method of claim 37 wherein the selectively absorbing composition includes at least one rare earth element.

39. The method of claim 37 wherein the pump band includes wavelengths between about 970 and about 990 nm, and the signal band includes wavelengths between about 1500 and 1600 nm.

40. A selectively absorbing optical fiber comprising:
a core; and
a cladding layer essentially in contact with the core layer, and including a selectively absorbing composition,
wherein the core layer does not include the selectively-absorbing composition;
wherein the selectively absorbing optical fiber has an absorption loss of less than 0.5 dB/m at wavelengths in a pump band, and an absorption loss of greater than 2.0 dB/m at wavelengths in a signal band; and
wherein the optical fiber is used as a filter.

41. The selectively absorbing optical fiber of claim 40 wherein the pump band includes wavelengths between about 970 and about 990 nm, and the signal band includes wavelengths between about 1500 and 1600 nm.

42. A selectively absorbing optical fiber comprising:
a core; and
a cladding layer,
wherein at least one of the core layer and the cladding layer includes a selectively absorbing composition;
wherein the selectively absorbing optical fiber has an absorption loss of less than 0.5 dB/m at wavelengths in a pump band, and an absorption loss of greater than 2.0 dB/m at wavelengths in a signal band; and
wherein the optical fiber is a polarization maintaining fiber, and has a birefringence ($\Delta n_{Bi}$) of at least about $1 \cdot 10^{-5}$, and is used as a filter.

43. The selectively absorbing optical fiber of claim 42 wherein the pump band includes wavelengths between about 970 and about 990 nm, and the signal band includes wavelengths between about 1500 and 1600 nm.

44. An optical device comprising:
a selectively absorbing optical fiber including a core, and a cladding layer,
wherein at least one of the core layer and the cladding layer includes a selectively absorbing composition;
wherein the selectively absorbing optical fiber has an absorption loss of less than 0.5 dB/m at wavelengths in a pump band, and an absorption loss of greater than 2.0 dB/m at wavelengths in a signal band;
wherein the selectively absorbing optical fiber is used as a filter; and
wherein the selectively absorbing optical fiber is photosensitive, and includes a fiber Bragg grating.

45. The selectively absorbing optical fiber of claim 44 wherein the pump band includes wavelengths between about 970 and about 990 nm, and the signal band includes wavelengths between about 1500 and 1600 nm.

* * * * *